Patented Aug. 30, 1938

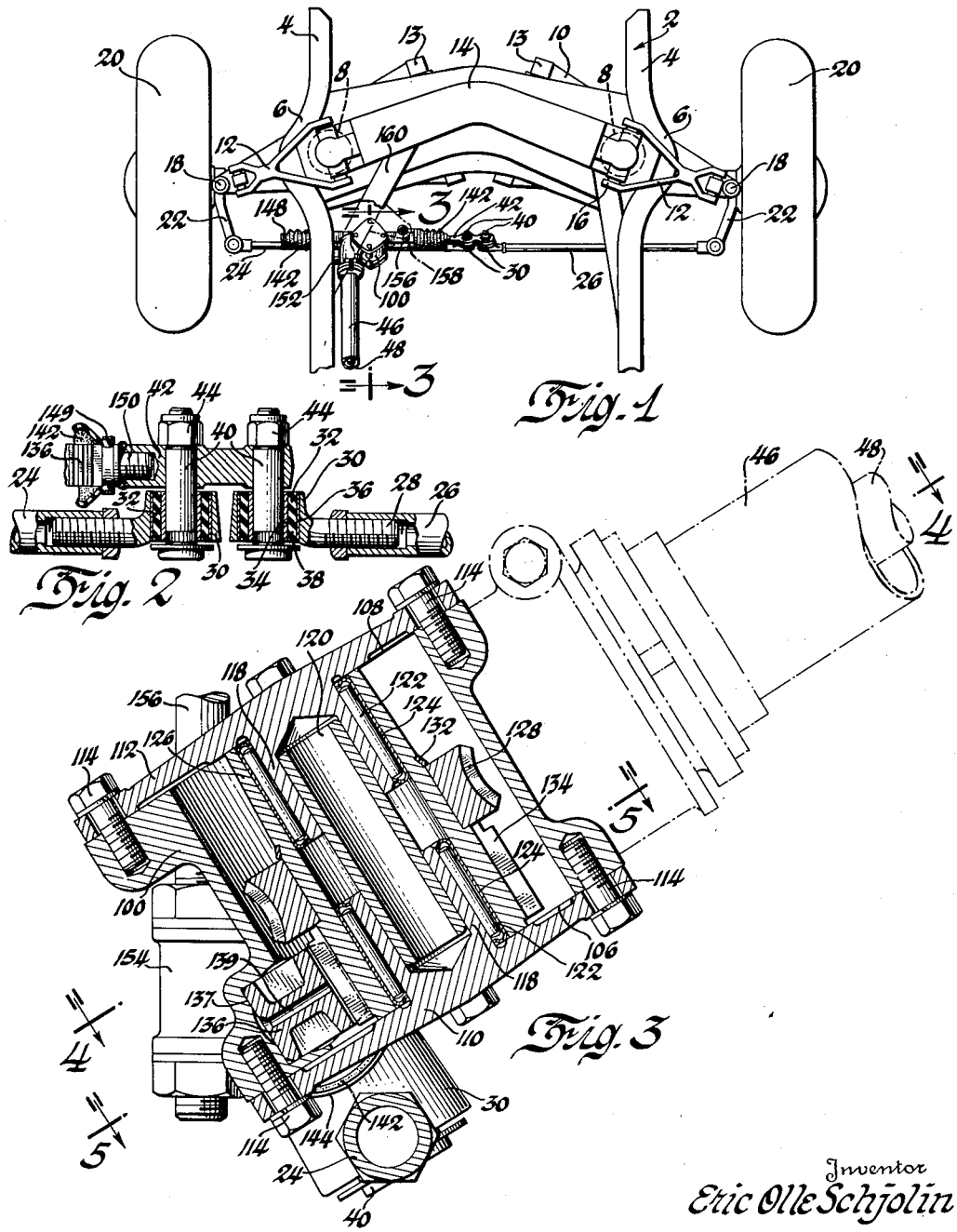

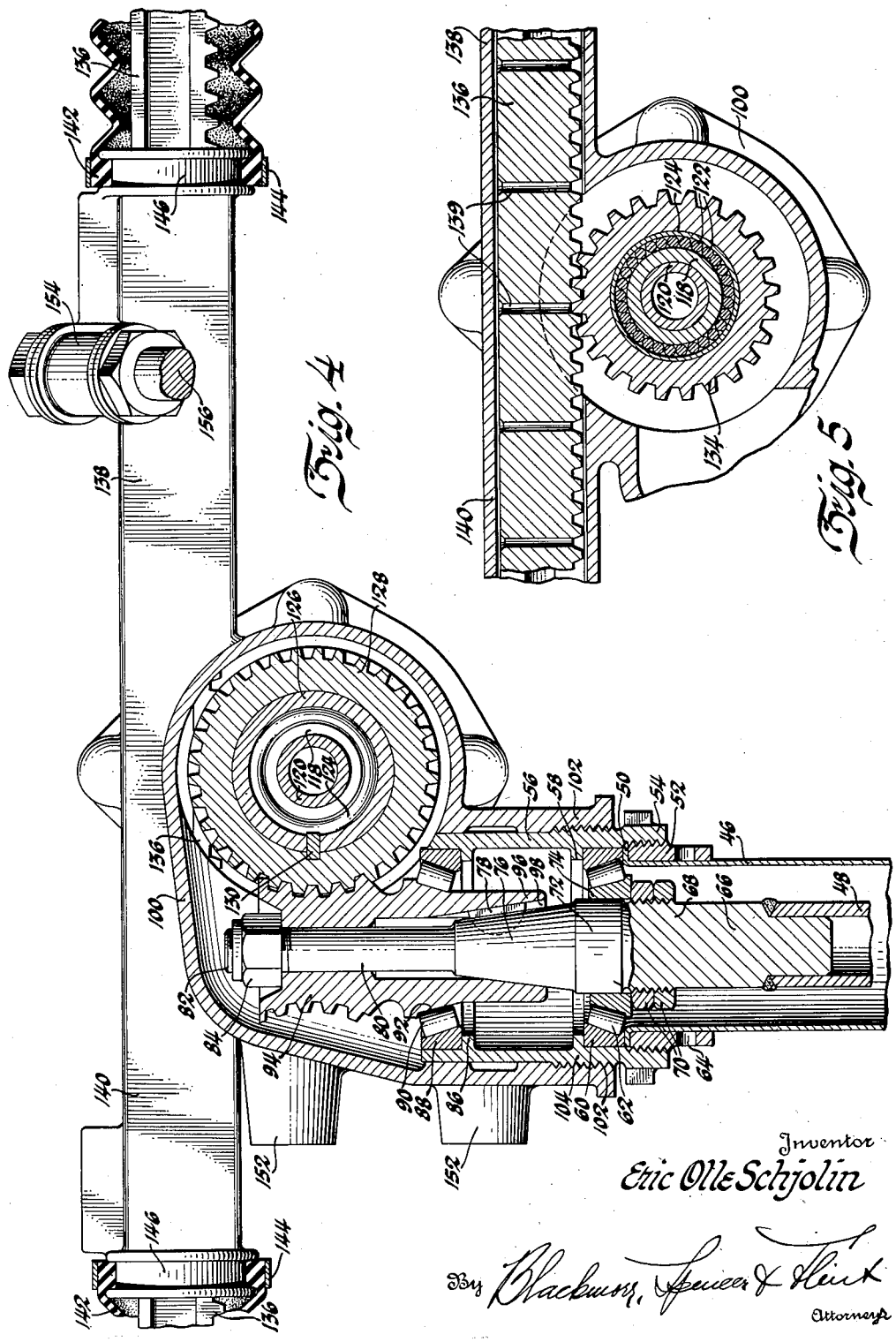

2,128,329

UNITED STATES PATENT OFFICE 2,128,329

STEERING GEAR ASSEMBLY

Eric Olle Schjolin, Pontiac, Mich., assignor to General Motors Corporation, Detroit, Mich., a corporation of Delaware Application June 28, 1937, Serial No. 150,705

6 Claims. (Cl. 280—96)

This invention relates to steering gears used to operate the steering wheels of automotive vehicles. The improvement relates particularly to the motion transmitting mechanism at the base of the usual steering mast whereby the motion of the usual steering wheel is transmitted to a transverse linkage which operates the steering wheels.

The principal feature of novelty of the invention resides in the use of a gear wheel meshing with and operating with a rack in the housing mounted at the base of the steering mast. To the end of this rack a suitable linkage is connected, the linkage in turn being connected to the steering wheels to turn them.

On the drawings—

Figure 1 is a plan view of the front part of an automotive vehicle showing the steering arrangement applied.

Figure 2 is an enlarged sectional detailed view of the connection between the end of the steering rack and the transverse linkage.

Figure 3 is an enlarged sectional detailed view on the line 3—3 of Figure 1.

Figures 4 and 5 are sectional detailed views on the corresponding lines of Figure 3.

Referring to the drawings the numeral 2 indicates the vehicle as a whole. The vehicle comprises the frame 4 having the usual two side bars which are arched near their front ends as at 6 to accommodate the coil springs 8 of the independent wheel suspension. The wheel suspension is mounted between the lower wishbone or arms 10 and the upper wishbone or arms 12. The lower arms 10 are pivoted at 13 to a transverse member 14 extending between the side members 4 while the upper arms 12 are pivoted at 16 to the upper part of the transverse member 14. The usual king pins 18 are supported at the ends of the steering arms, the king pins 18 supporting the usual arbors on which the wheels 20 are turnably mounted. Each king pin 18 has the lever 22 and to the levers 22 there are connected the rods 24 and 26, the rods being preferably in the form of tubes as best shown in Figure 2. The rods 24 and 26 extend adjacent each other and have screwed therein the ends of the shanks 28 having the eyes 30 formed therein. In the eyes 30 there are received the bearing elements 32 comprising the inner and outer cylinders 34 and 36 between which there is positioned the rubber cylinder 38. Bolts 40 are mounted in the inner cylinders 34 and project away from the eyes 30. On the other end of the bolts there is positioned the end piece 42 held on the bolts by means of the nuts 44.

Referring to Figure 3, the usual stationary steering mast is indicated at 46 and has turnably mounted therein the steering tube 48. The mast 46 has mounted at the upper end the usual steering wheel (not shown) by means of which the steering tube 48 is turned. The lower end or base of the mast has the inturned flange 50 and around the mast and abutting against the flange 50 the externally threaded collar 52 is positioned. The collar 52 is adapted to be screwed into the internally threaded end 54 of a sleeve 56 having an internal ring shoulder 58 against which there is received the race 60 of the conical bearing 62. The other side of the outer race 60 abuts against the flange 50 and by tightening the collar 52 by means of a tool applied to the openings 64 the sleeve 56, bearing 62, mast 46, and collar 52 are rigidly secured together.

The end of the steering tube 48 has welded therein the shank 66 having a threaded part 68 over which the lock nuts 70 are screwed. The shank has the cylindrical bearing part 72 which fits tightly in the inner race 74 of the bearing 62 and below the cylindrical part 72 the shank has the tapered section 76 having a keyway therein for the reception of the key 78. The extremity of the shank 66 is plain as indicated at 80 and has a screw-threaded end 82 for the reception of a nut 84.

The sleeve 56 has the second annular shoulder 86 against which there is received the race 88 of the tapered bearing 90. The tapered pins of the bearing have their other bearing surfaces on the conical section 92 of an hourglass worm 94 which has a central bore for the reception of the lower plain part 80 of the shank 66. The upper part 96 of the hourglass worm 94 is formed into conical shape to mate with and fit onto the tapered part 76 of the shank and the key 78 fits in the keyway 98 in the tapered part 96, the key 78 holding the two tapered parts 76 and 96 together. The nut 84 holds the hourglass worm 94 on the end of the shank 66.

The housing 100 has a screw-threaded end 102 which screws onto the threaded part 104 of the sleeve 56. The housing 100 encloses the sleeve 56 and the hourglass worm 94 and has two open lateral faces 106 and 108 best shown in Figure 3. These lateral faces are covered by the covers or lids 110 and 112 which are secured to the housing by means of the machine bolts 114. The openings in the covers 110 and 112 to receive the machine bolts 114 are oversize so that by loosening the bolts either or both of the covers may be adjusted to take up wear.

Each cover 110 and 112 has an inwardly projecting extension 118, the extensions being hollow or bored and receive in the bore the tube 120 which accurately positions the two projections 118 with reference to each other. Over each projection 118 there is mounted a needle bearing 122, the needles being held by the annular races 124. Over the needle bearing race 124 there is positioned the hollow shaft 126 which has rigidly mounted at the middle thereof the worm wheel 128 which is constantly in mesh with the hourglass worm 94. The worm wheel 128 is keyed to the shaft 126 by means of the key 130 and is held from shifting on the shaft by means of the ring 132.

A series of teeth forming a gear wheel 134 is formed on the shaft 126 and constantly meshing with the gear 134 is the rack 136 which is generally rectangular in cross section and slides in the rectangular section 137 formed in the housing 100. Suitable openings 139 are provided in the rack to allow passage of lubricant.

The housing 100 has the extensions 138 and 140 projecting laterally therefrom in which the rack 136 is received and in which it is adapted to slide, the interior of the extensions being formed of a shape to accommodate the shape of the rack and form a bearing therefor. The rack extends beyond the ends of the housing extensions 138 and 140 and at the end 140 there is applied the flexible boot 142 secured by a ring 144 over a shoulder 146 on the end of the housing. The other end of the boot shown at 148 in Figure 1 is secured to the end of the rack.

The end of the extension 138 also has a shoulder 146 and a ring 144 secures a similar flexible boot 142 in place. The other end of the flexible boot 142 is secured as shown at 149 to the end of the rack. The rack end adjacent the point 149 is screw-threaded as indicated at 150 and is screwed into the screw-threaded opening in the end of the end piece 42 so that there is a rigid interconnection between the rack and end piece 42 which in turn is pivotally connected to the connecting rods 24 and 26.

The operation of the mechanism is as follows: the operator turns the steering wheel (not shown) which rotates the steering tube 48 which in turn operates the hourglass worm 94. The hourglass worm 94 being constantly in mesh with the worm wheel 128 will rotate the worm wheel and whereby rotate the shaft 126 on its needle bearing 122. The shaft 126 will move the gear 134 which, being in mesh with the rack 136, will shift the rack either to the right or to the left according to the direction in which the steering wheel has been turned. The movement of the rack will be transmitted through the connection shown in Figure 2 to the connecting rods 24 and 26 to turn the steering wheel 20 in the desired direction.

Referring to Figures 1, 3, and 4, it will be noted that the housing 100 has extensions 152 thereon which are tapped for the reception of bolts by means of which the housing 100 is secured to the side bar of the frame 4. Similarly, the extension housing 138 has the boss 154 formed thereon in which there is received the bolt 156 which is rigidly attached to a plate 158 shown in dotted lines in Figure 1, the plate in turn being attached to an oblique member 160 forming part of the chassis.

I claim:

1. In an assembly for a steering gear for automotive vehicles, a steering mast, a housing secured to the end of the mast, said housing having mounted therein a worm actuated by the usual steering wheel and a worm wheel actuated by the worm, a gear mounted in the housing to turn with the worm assembly, a rack slidably mounted in the housing and meshing constantly with the gear, said rack movable transversely of the vehicle, and means connecting the rack to the steerable wheels of the vehicle to steer the vehicle in response to movements of the steering mechanism.

2. In an assembly for a steering gear for automotive vehicles, a steering mast, a housing secured to the end of the mast, said housing having mounted therein a worm actuated by the usual steering wheel and a worm wheel actuated by the worm, a gear mounted in the housing to turn with the worm wheel, lateral extensions on the housing, a rack slidably mounted in the extensions and meshing constantly with the gear, said rack movable transversely of the vehicle, and means connecting the rack to the steerable wheels of the vehicle to steer the vehicle in response to movements of the steering mechanism.

3. In an assembly for a steering gear of a motor vehicle, a steering mast, a turnable tube mounted in the mast, a worm on the end of the tube, a housing, a shaft in the housing, a worm wheel meshing with said worm and mounted on the shaft in the housing, a gear on the shaft, and a rack mounted in the housing and meshing with the gear and adapted to operate the steering linkage connected with the steering wheels.

4. In an assembly for a steering gear, a housing, covers for the housing, extensions on the covers extending into the housing, a shaft surrounding said extensions and rotatable in bearings mounted thereon, a worm wheel rigidly secured to the said shaft, and a gear on the said shaft.

5. In an assembly for a steering gear, a housing, covers for the housing, extensions on the covers extending into the housing, a shaft surrounding said extensions and rotatable in bearings mounted thereon, a worm wheel rigidly secured to the said shaft, a gear on the said shaft, and a rack mounted in said housing and engaged by the gear to be moved thereby.

6. In an assembly for a steering gear for automotive vehicles, a steering mast, a housing secured to the end of the mast, said housing having mounted therein a worm actuated by the usual steering wheel and tube and a worm wheel actuated by the worm, a gear mounted in the housing to turn with the worm assembly, a rack slidably mounted in the housing and meshing constantly with the gear, said rack movable transversely of the vehicle, independent links conected to the end of the racks and operatively connected to the steering wheels and adapted to steer the wheels in response to the movement of the steering mechanism.

ERIC OLLE SCHJOLIN.